(12) United States Patent
Bliss

(10) Patent No.: US 9,160,482 B2
(45) Date of Patent: Oct. 13, 2015

(54) PHY RETRAINING

(75) Inventor: William Bliss, Thornton, CO (US)

(73) Assignee: Broadcom Corporation, Irvine, CA (US)

( * ) Notice: Subject to any disclaimer, the term of this patent is extended or adjusted under 35 U.S.C. 154(b) by 904 days.

(21) Appl. No.: 12/880,771

(22) Filed: Sep. 13, 2010

(65) Prior Publication Data

US 2012/0063295 A1    Mar. 15, 2012

(51) Int. Cl.
*H04L 12/26* (2006.01)
*H04J 3/06* (2006.01)
*H04L 12/28* (2006.01)
*H04J 11/00* (2006.01)
*H04L 5/16* (2006.01)
*H04L 1/00* (2006.01)
*H04L 12/24* (2006.01)

(52) U.S. Cl.
CPC .......... *H04L 1/0001* (2013.01); *H04L 41/0672* (2013.01); *H04L 1/0057* (2013.01)

(58) Field of Classification Search
USPC ............................... 370/216, 242, 503, 395.2
See application file for complete search history.

(56) References Cited

U.S. PATENT DOCUMENTS

| 8,320,411 | B1 * | 11/2012 | Sedarat et al. | 370/503 |
|---|---|---|---|---|
| 2006/0056283 | A1 * | 3/2006 | Anikhindi et al. | 370/208 |
| 2007/0076722 | A1 * | 4/2007 | Ungerboeck et al. | 370/395.2 |
| 2012/0014420 | A1 * | 1/2012 | Wu et al. | 375/219 |

* cited by examiner

*Primary Examiner* — Kiet G Tang
(74) *Attorney, Agent, or Firm* — Sterne, Kessler, Goldstein & Fox P.L.L.C.

(57) ABSTRACT

Embodiments enable quick PHY re-training when the link is restarted due an event such as EMI, for example. In particular, embodiments recognize that, in the case of such events as EMI, a substantial portion of the training process as prescribed in the standard can be bypassed during the link restart without affecting subsequent link performance. In particular, embodiments recognize that a substantial amount of previously learned link parameters may still be used after link restart, and thus eliminate the need to re-learn them thereby speeding up the link restart process. Further, embodiments recognize that the standard prescribed link start up procedure can be accelerated in the case of link restart by reducing standard prescribed periods for transitioning between states of the link start up process. Additionally, embodiments provide a mechanism that relies on the auxiliary bit (AUX) of LDPC coded user data frames to pre-emptively and dynamically notch out troublesome EMIs before they cause the link to fail.

22 Claims, 8 Drawing Sheets

PHY RETRAINING

BACKGROUND

1. Field of the Invention

The present invention relates generally to link communications.

2. Background Art

In Ethernet communications, wideband electromagnetic interference (EMI) can cause the Ethernet PHY (Physical Layer) to enter into an infinite error propagation condition, which requires link restart and PHY re-training according to the IEEE 802.3 standard. Link start up and PHY training typically takes up to two seconds, during which user data may not be communicated. Accordingly, there is a need to accelerate link restart and PHY re-training in cases of link restart due to EMI events.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

I. Ethernet Overview

Figure 1:
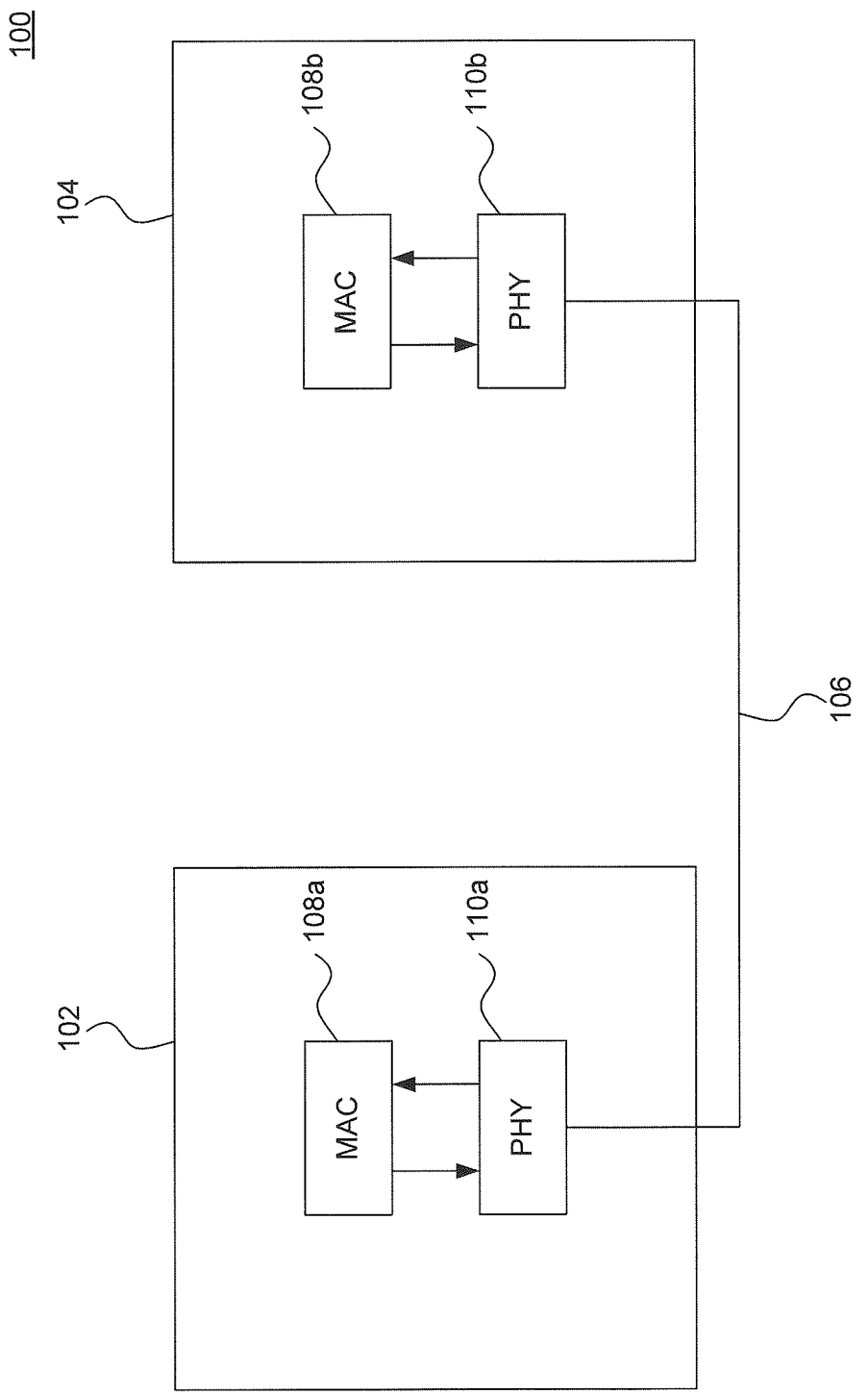
FIG. 1 is a block diagram that illustrates an example Ethernet connection.

FIG. 1 is a block diagram that illustrates an example Ethernet connection 100. As shown in FIG. 1, example Ethernet connection 100 includes a first Ethernet node 102 and a second Ethernet node 104. The first and second Ethernet nodes 102 and 104 are connected by an Ethernet link 106. Ethernet nodes 102 and 104 may be any devices that support Ethernet. Ethernet link 106 may be any Ethernet compliant medium. Thus, example connection 100 may represent any Ethernet configuration, including, for example, 10 Mbit/s Ethernet, Fast Ethernet (e.g., 100BASE-T, 100BASE-TX, etc.), Gigabit Ethernet (e.g., 1000BASE-T, 1000BASE-TX, etc.), and 10-Gigabit Ethernet (e.g., 10 GBASE-SR, 10G-BASET, etc.).

The first and second Ethernet nodes 102 and 104 each includes a Medium Access Control (MAC) sublayer 108 and a physical interface transceiver (PHY) 110. MAC 108 is an Ethernet MAC as defined by the IEEE 802.3 Ethernet standard and implements the data-link layer of the Open System Interconnect (OSI) network model. PHY 110 is an Ethernet PHY as defined by the IEEE 802.3 standard and implements the physical layer of the OSI network model.

Typically, MAC 108 and PHY 110 communicate via a Media Independent Interface (MII), which is an Ethernet industry standard defined in IEEE 802.3. MII includes a data interface and a management interface. The data interface includes separate transmit and receive channels. The management interface is a two-signal interface (one signal for clocking and one signal for data) which allows MAC 108 to monitor and control PHY 110.

Figure 2:
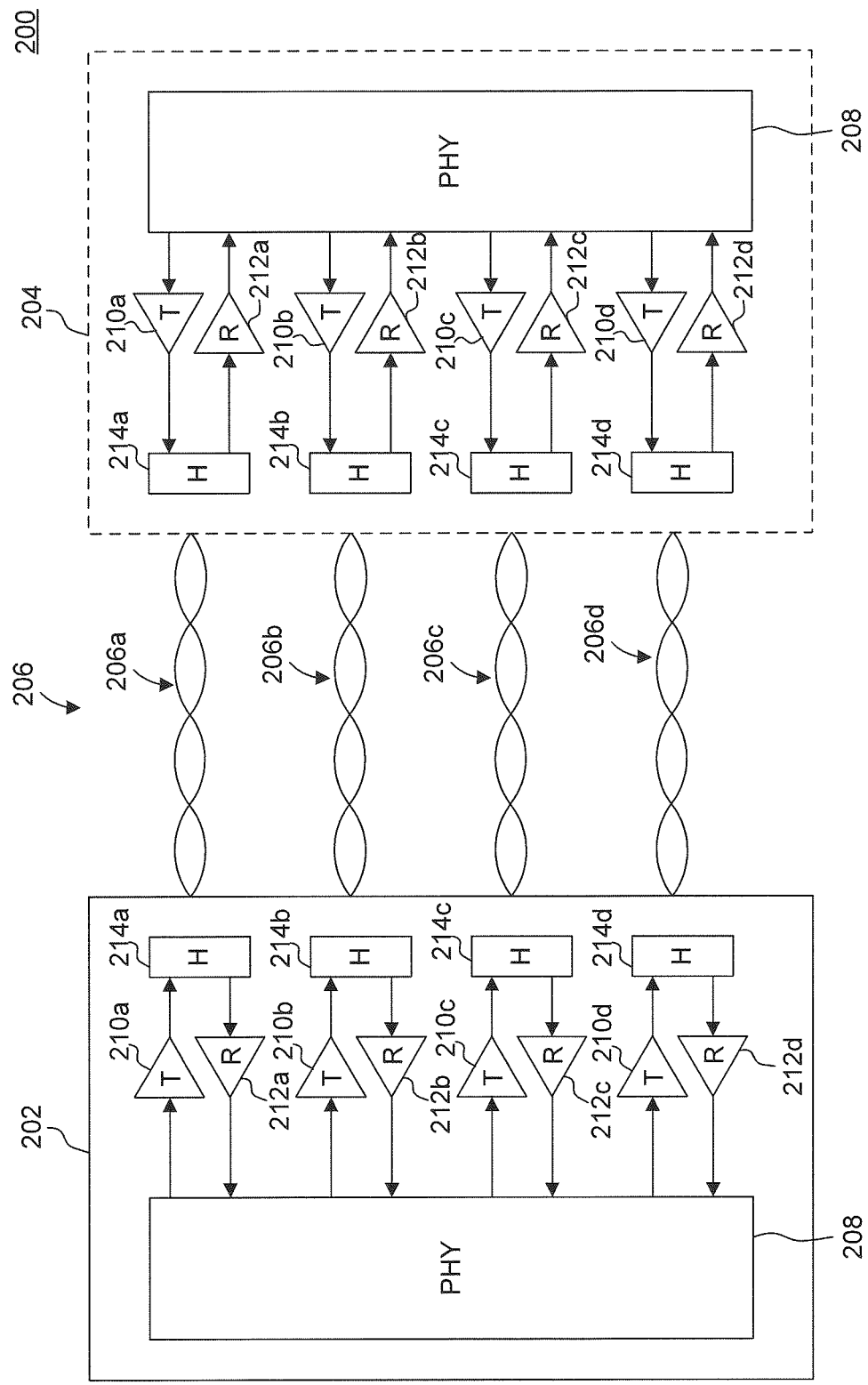
FIG. 2 is a block diagram that illustrates an example 10GBASE-T Ethernet connection.

FIG. 2 is a block diagram that illustrates an example 10 GBASE-T Ethernet connection 200. As shown in FIG. 2, example 10 GBASE-T connection 200 includes first and second transceiver nodes 202 and 204 connected via a 4-wire unshielded twisted pair (UTP) cable 206. Each transceiver node 202 or 204 includes a PHY 208, a plurality of transmitters 210a-d, a plurality of receivers 212a-d, and a plurality of hybrid circuits 214a-d.

PHY 202 implements PHY layers requirements as defined in the IEEE 802.3 Ethernet standard, including controlling transmitters 210 and receivers 212. Transmitters 210 and receivers 212 enable transmission/reception of data between nodes 202 and 204 over UTP cable 206. In particular, each transmitter-receiver pair (e.g., 210a, 212a; 210b, 212b; etc.) with their respective hybrid circuit 214 utilize a corresponding wire pair (e.g., 206a, 206b, etc.) of UTP cable 206. For example, transmitter 212a and receiver 212a (using hybrid circuit 214a) utilize wire pair 206a. In 10 GBASE-T, each wire pair 206a-d allows a data rate of 2.5 Gbit/sec.

II. Ethernet PHY Overview

Figure 3:
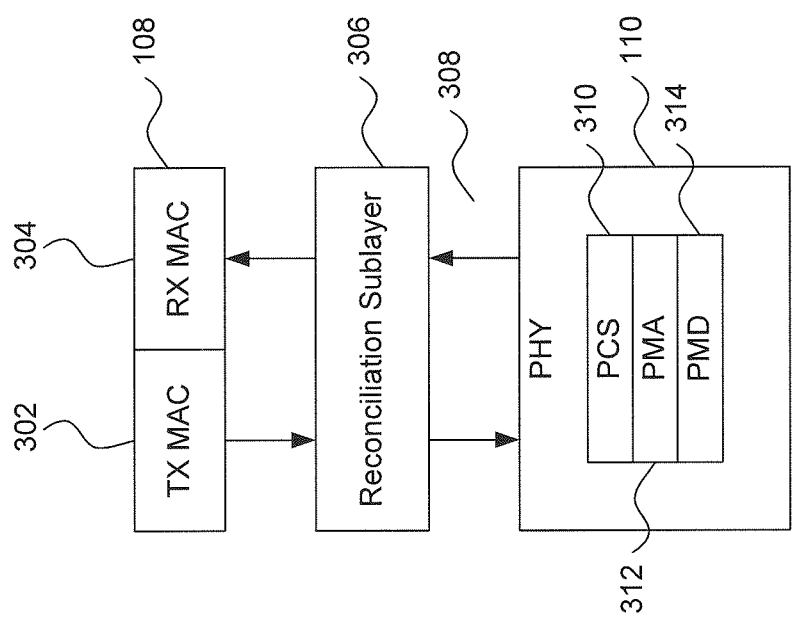
FIG. 3 is a block diagram that illustrates network layers of an Ethernet node.

FIG. 3 is a block diagram 300 that further illustrates the MAC and PHY layers of an Ethernet node. As shown in FIG. 3, MAC 108 includes a transmit portion TX MAC 302 and a receive portion RX MAC 304. A reconciliation sublayer 306 connects MAC 108 to MII interface 308. Generally, reconciliation sublayer 306 maps Physical Signaling (PLS) service primitives from MAC 108 to MII signals, and vice versa. PHY 110 includes a Physical Coding Sublayer (PCS) 310, a Physical Medium Attachment (PMA) sublayer 312, and a Physical Medium Dependent (PMD) sublayer 314. Further description of the internals of the PHY layer and sublayers are provided below with reference to FIG. 4.

Figure 4:
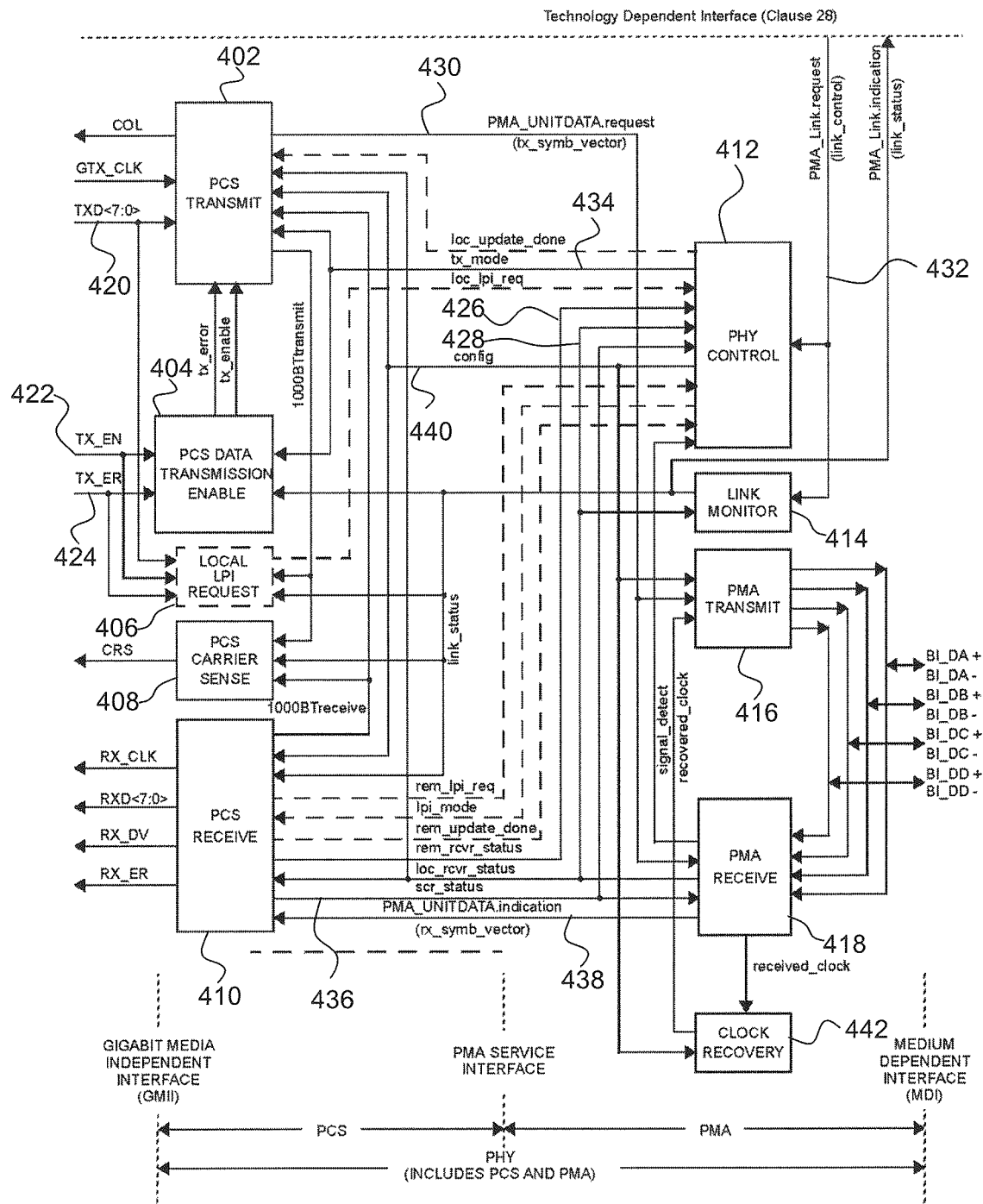
FIG. 4 is a block diagram that illustrates an example Ethernet PHY layer.

FIG. 4 is a block diagram that illustrates an example Ethernet PHY layer. In particular, FIG. 4 illustrates functions/interconnections of the PCS (Physical Coding Sublayer) and PMA (Physical Medium Attachment) sublayers of an Ethernet PHY.

PCS functions (i.e., PCS Transmit function 402, PCS Data Transmission Enable function 404, Local LPI Request function 406, PCS Carrier Sense function 408, and PCS Receive function 410) communicate via the MII interface with the MAC layer of the Ethernet node. PMA functions (i.e., PHY Control 412, Link Monitor function 414, PMA Transmit function 416, and PMA Receive function 418) communicate via a Medium Independent Interface (MDI) with lower sublayers of the PHY (e.g., PMD sublayer). Further, as shown in FIG. 4, PCS functions and PMA functions communicate with each others via signals of a PMA service interface. Functions and signals relating to LPI (Low Power Idle) mode are shown with dashed lines and are optional.

PCS Transmit function 402 receives a bundle of data signals TXD 420 from the MAC layer. PCS Transmit function 402 also receives a tx_enable signal from PCS Data Transmission Enable function 404. The tx_enable signal is set by PCS Data Transmission Enable function 404 according to a TX_EN signal 422, received from the MAC layer. TX_EN 422 is used by the MAC layer to enable/disable data transmission by PCS Transmit function 402 and the PHY generally. When data transmission by PCS Transmit function 402 is enabled, PCS Transmit function 402 outputs signal tx_symb_vector 430, which includes a vector of (PAM-modulated) symbols for transmission by PMA Transmit function 416. PCS Transmit function 402 may operate in three basic modes: normal, training mode, and low power idle mode, and may use different PAM modulation in each mode. The mode of operation of PCS Transmit function 402 is determined by signal tx_mode 434 (generated by PHY Control function 412). In 10 GBASE-T, PCS Transmit 402 performs scrambling and coding of data to generate four symbols, one for each of the four transmitters of the PHY.

PMA Transmit 416 transmits the symbols output by PCS Transmit 402 onto the physical medium attached to the PHY. An analog front end (AFE) (not shown in FIG. 4) is typically coupled between PMA Transmit 416 and the physical medium to effectuate the physical medium transmission. In addition, PMA Transmit 416 may include pulse shaping filters and/or pre-coders (e.g., Tomlinson-Harashima Precoder) to ensure that the signals transmitted over the physical medium fall within pre-defined EMI (Electromagnetic Interference) requirements.

PMA Receive 418 receives analog signals from the AFE (over the MDI interface) and decodes the received analog signals to generate a vector of symbols rx_symb_vector 438. In particular, PMA Receive 418 receives PAM-modulated signals over pairs BI_DA, BI_DB, BI_DC, and BI_DD, translates the PAM-modulated signals into rx_symbol_vector 438, and provides rx_symbol_vector 438 to PCS Receive 410. Accordingly, PMA Receive 418 generally includes such components as equalizers, echo/crosstalk cancellers, and sequence estimators. In addition, PMA Receive 418 uses a scrambler status signal scr_status 436 from PCS Receive 410 (together with information regarding the status of equalization, cancellation, and estimation functions) to generate a signal loc_rcvr_status 440 representative of the performance of the receiver. PMA Receive 418 provides loc_rcvr_status 440 to both PHY Control 412, PCS Transmit 402, and PCS Receive 410.

PHY Control 412 is the main controller of the PHY and is responsible for configuring PCS Transmit 402, PCS Receive 410, PMA Transmit 416, and PMA Receive 418, in order to bring the PHY into different modes of operations (e.g., auto-negotiation, training, data). In particular, PHY Control 412 receives a signal link_control 432 from a module (not shown in FIG. 4) responsible for implementing the auto-negotiation procedure of the PHY. Link_control 432 is set to DISABLE during the auto-negotiation procedure, which causes PHY Control 412 to be in the DISABLE TRANSMITTER state (disabling all transmitters). When the auto-negotiation procedure establishes the presence of a remote station on the link, link_control 432 is set to ENABLE and PHY Control 412 enters a SLAVE SILENT state, during which PHY Control 412 sets tx_mode 434 to SEND_Z (which forces transmission of zeros on the link).

Subsequently, PHY Control 412 transitions the PHY into training mode by setting tx_mode 434 to SEND_T. Training may involve different state transitions depending on whether the PHY is operating in MASTER or SLAVE mode. In particular, in MASTER mode, PHY Control 412 transitions immediately to a training state after auto-negotiation. In SLAVE mode, PHY Control 412 transitions to training mode only after convergence of the PHY's DFE (Decision Feedback Equalizer) (located in PMA Receive 418), timing acquisition, and the scrambler is ready. MASTER/SLAVE determination occurs during auto-negotiation, and PHY Control 412 uses config signal 440 to indicate the MASTER/SLAVE status of the PHY to PCS Transmit 402, PCS Receive 410, PMA Transmit 416, and Clock Recovery module 442.

As shown in FIG. 4, PHY Control 412 receives signals rem_rcvr_status 426, loc_revr_status 428, and scr_status 436. Rem_rcvr_status 426 indicates the status of the remote PHY receiver and is communicated by the PHYs at the end of training to indicate successful training completion. Loc_rcvr_status 428 indicates the status of the local receiver and is generated by PMA Receive 418. Loc_rcvr_status 428 is set to OK when the PHY receiver has established proper receive parameters, including final convergence of filter parameters. Based on the received signals, PHY Control 412 determines transition into the SEND DATA state. In particular, if the PHY receiver and scrambler are ready for data transmission, PHY Control 412 transitions the PHY into SEND DATA state by setting tx_mode 434 to SEND_N. Data transmission over the link can then take place.

III. PHY Training Overview

Figure 5:
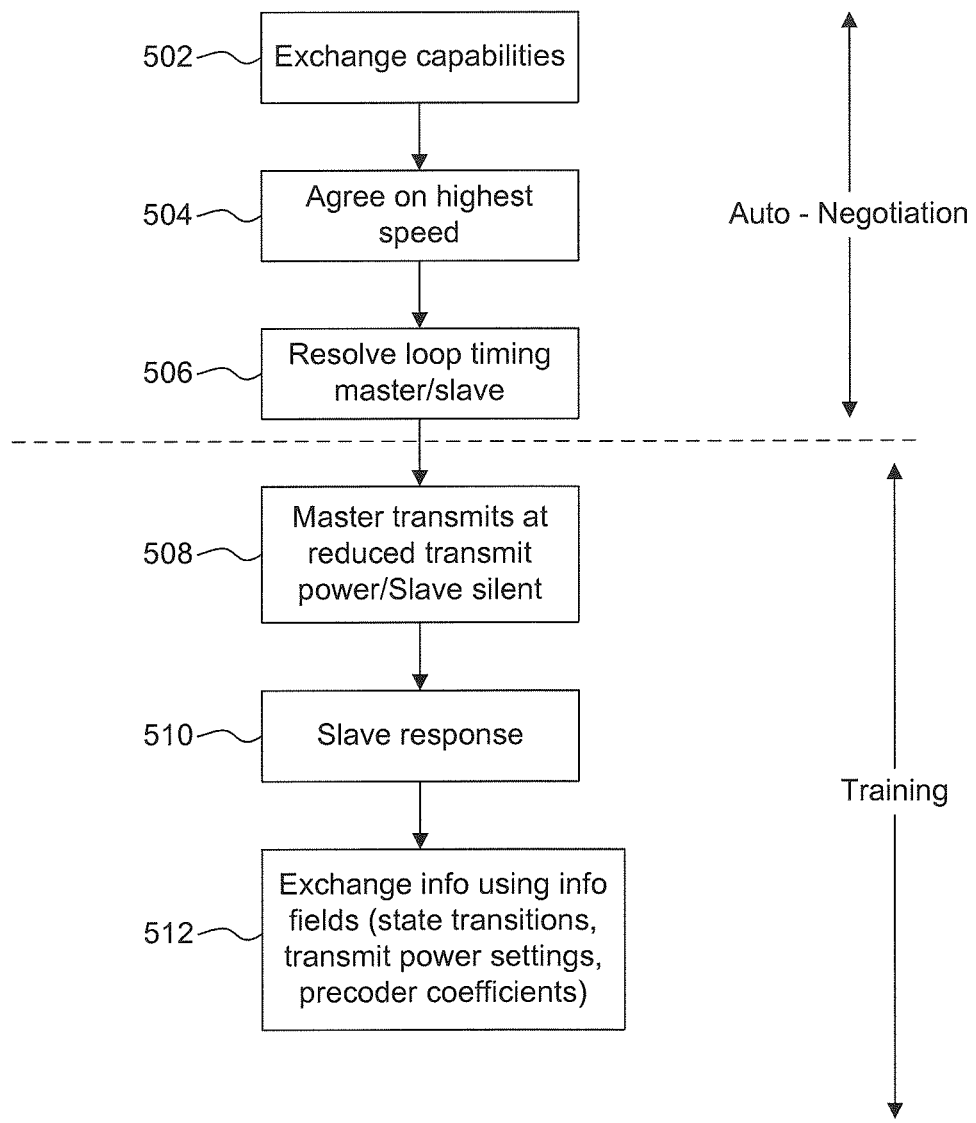
FIG. 5 is a flowchart that illustrates the startup procedure of an Ethernet link.

FIG. 5 is a process flowchart 500 that illustrates the startup of an Ethernet link. In particular, process flowchart 500 generally illustrates the auto-negotiation and training procedures performed during link startup, reset and/or link failures, and assumes that the two nodes connected by the Ethernet link have already detected each other's presence over the link.

As shown in FIG. 5, process 500 begins auto-negotiation in step 502, which includes exchanging capabilities between the nodes connected by the PHY link. This generally includes exchange of information regarding speed and duplex abilities. Subsequently, step 504 includes agreeing on a highest supported speed, which includes comparing the abilities of the two nodes and selecting the highest performance common technology. Finally, in step 506, loop timing is resolved and master/slave determination is made.

Training begins in step 508, which includes the master node transmitting at a reduced transmit power, with the slave node in SILENT mode. Then, in step 510, the slave node transitions out of SILENT mode into training mode, and both nodes engage in a training procedure in step 512. In particular, in step 512, the nodes exchange periodic PMA training frames which include known pseudorandom sequences. In addition, the PMA training frames include an Info Field which is used to exchange control information between the two nodes. For example, the Info Field is used to exchange power setting information and to communicate THP precoder coefficients.

Figure 6:
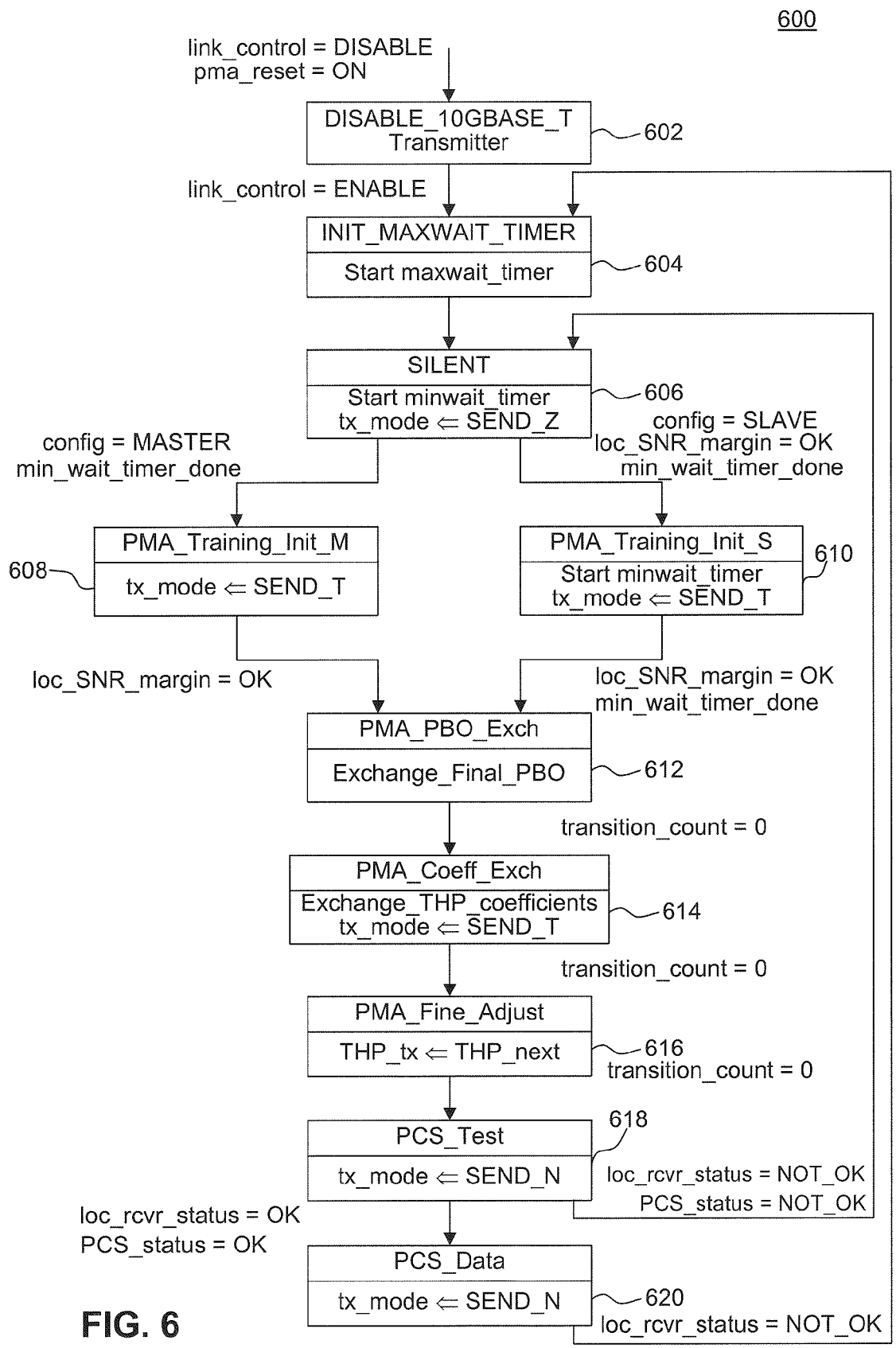
FIG. 6 is an example PHY Control state diagram.

FIG. 6 is an example state diagram 600 that illustrates link startup state transitions that take place within a PHY Control module (e.g., PHY Control 412) of a PHY. State diagram 600 begins in state 602 with the PHY Control in the DISABLE_10GBASE-T Transmitter state after receiving a link_control=DISABLE signal from the auto-negotiation module. When link_control is enabled (at the end of auto-negotiation), the PHY Control transitions to state 604 in which it initiates a timer (maxwait_timer). When the timer expires, the PHY Control transitions to a PHY SILENT state 606. In state 606, the PHY Control initiates a timer (minwait_timer) and set the transmission mode (tx_mode) to SEND_Z.

If the PHY is configured as a MASTER node after auto-negotiation, the PHY Control transitions from SILENT state 606 to PMA_Training_Init_M state 608 immediately after the expiration of the timer (minwait_timer) initiated in state 606. If the PHY is configured as a SLAVE node after auto-negotiation, the PHY Control transitions from SILENT state 606 to PMA_Training_Init_S state 610 after the timer (minwait_timer) has expired and an acceptable local SNR margin has been achieved at the receiver. The PHY sets the transmission mode to SEND_T in states 608 and 610 to indicate the beginning of PMA training.

The master and slave nodes exchange PMA training frames during training. The PMA training frames include known pseudorandom sequences in addition to control information communicated through an information field (InfoField) of the PMA training frames. The control information allows the two nodes to train their receivers, echo cancellers, and to establish an appropriate transmit power level.

In particular, after initiating training in steps 606 and 608, both nodes transition to PMA_PBO_Exch PHY Control state 612 if acceptable SNR margins have been achieved at both ends. In state 612, the two nodes exchange transmit power (Power Backoff) information using the PBO field of the InfoField. The two nodes also use the transition count field of the InfoField to indicate to each other the time at which the PBO settings change should be made.

When the transition count reaches zero, both nodes transition to PMA_Coeff_Exch PHY Control state 614. In state 614, the PBO settings change is made. In addition, the nodes exchange precoder (e.g., THP) coefficients using InfoFields. For example, decision feedback equalizer (DFE) coefficients are communicated to be used by the other node's THP. In addition, the two nodes communicate using the transition count field the time to transition to the next state, PMA_Fine_Adjust PHY Control state 616.

When the transition count reaches zero, both nodes transition to state 616. In state 616, the precoder coefficients exchanged in state 614 are applied to the THPs, and PMA training frames are exchanged with the THP enabled. Final adjustments are made to ensure final convergence of adaptive filters on both sides. Then, the nodes again use the transition count field of the InfoField to transition to PCS_Test PHY Control state 618.

During state 618, the two nodes exchange PCS frames that include test data, while each node monitors its receiver performance. The PCS frames may be low-density parity-check (LDPC) coded frames. After a predetermined period, if receiver performance is acceptable at both nodes, the two nodes transition to PCS_DATA PHY Control state 620. However, if receiver performance at a node is not acceptable (due to decoding failures, for example), the node will transition back to SILENT state 604. This will cause the other node to detect an error condition and also transition to SILENT state 604, upon which the training process is re-started.

In PCS_DATA state 620, the two nodes communicate user data. As in PCS Test state 618, if an error condition is detected at a node, the node will transition back to state 604 to restart training. This will cause the other node to also detect an error condition and transition back to training.

IV. Quick PHY Re-Training

As described above, 10 GBASE-T specifies the use of UTP cables between nodes. Thus, many EMI (Electromagnetic Interference) events are mitigated against by having rejection of common mode signals. In addition, residual DFEs (Decision Feedback Equalizer) (which can generally be considered to encompass residual DFEs, tone cancellers, adaptive tone cancellers, and adaptive line enhancers, and which term is used herein to describe this type of feedback-based circuits) are capable of tracking and recovering from narrowband EMI, without the need for a link restart. However, wideband EMI (i.e., EMI with fast fluctuating amplitude such as static discharge, for example) events can cause residual DFEs (as well as timing recovery modules) to have infinite error propagation ("to hang up" as referred to in the art). When that occurs, the 10 GBASE-T standard specifies that the link be restarted. Link restart typically requires 1 to 2 seconds in order to learn the link and perform timing recovery and synchronization.

Embodiments of the present invention, as further discussed below, enable quick PHY re-training when the link is restarted due to an event such as EMI, for example. In particular, embodiments allow that, in the case of such events as EMI, a substantial portion of the training process as prescribed in the standard be bypassed during the link restart without affecting subsequent link performance. Further, embodiments recognize that a substantial amount of previously learned link parameters may still be used after link restart, and thus eliminate the need to re-learn them thereby speeding up the link restart process. Additionally, embodiments enable the standard prescribed link start up procedure to be accelerated in the case of link restart by reducing standard prescribed periods for transitioning between states of the link start up process. Further, embodiments provide systems and methods to pre-emptively and dynamically notch out troublesome EMIs before they cause the link to fail.

Figure 7:
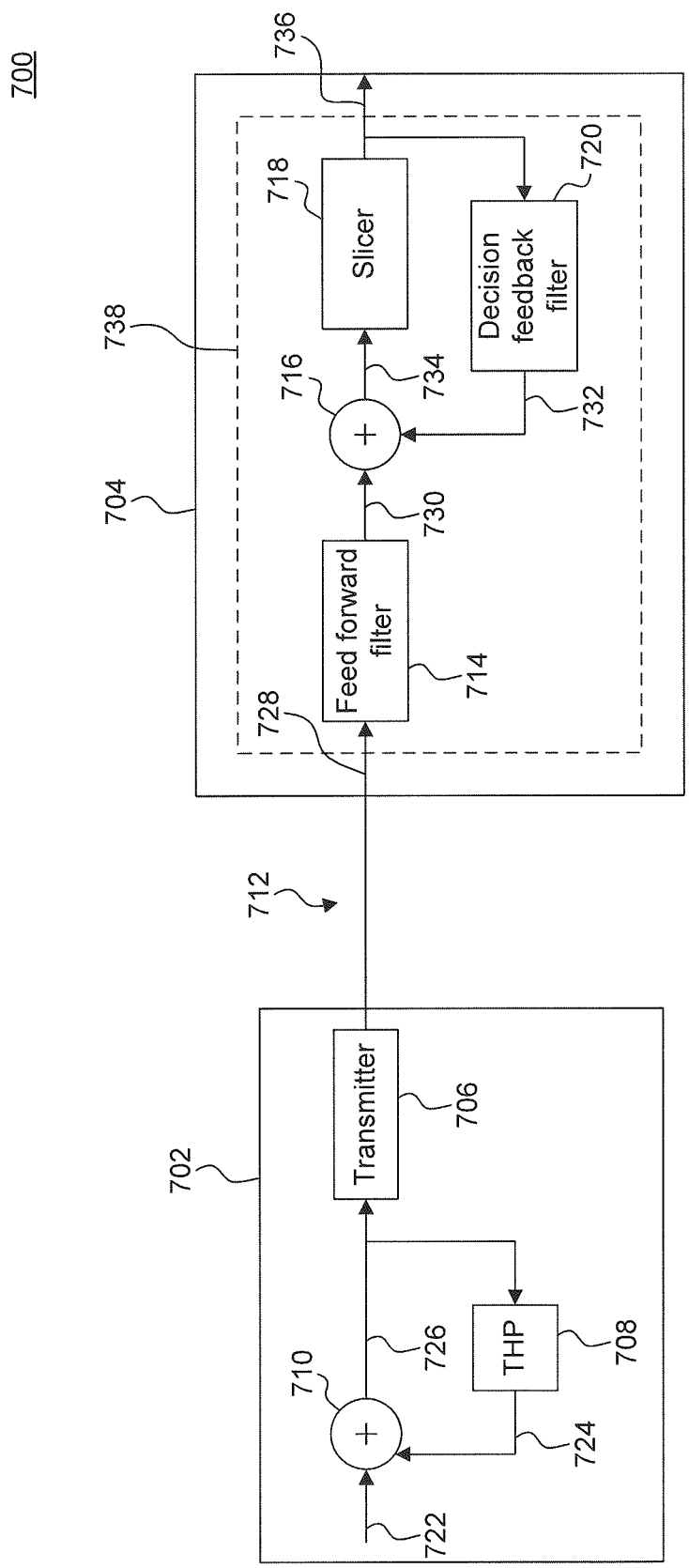
FIG. 7 illustrates a transmitter and a receiver communicating over a link.

FIG. 7 illustrates a transmitter and a receiver communicating over a link. In particular, FIG. 7 illustrates elements of the PMA Transmit module of a transmitting PHY node 702 interacting with elements of the PMA Receive module of receiving PHY node 704. Accordingly, at PHY node 702, there is shown a transmitter 706, a Tomlinson-Harashima precoder (THP) 708, and an adder 710. Adder 710 receives as inputs a signal 722 and the output 724 of THP 708, and outputs a signal for transmission 726. Signal 726 is provided both to transmitter 706 and to THP 708. Transmitter 706 transmits signal 726 over link 712 to PHY node 704. THP 708 acts on signal 726 to generate output signal 724.

At PHY node 704, there is shown a Decision Feedback Filter (DFE) 738, which includes a feed forward filter 714, an adder 716, a slicer 718, and a decision feedback filter 720. Feed forward filter 714 receives an input signal 728 and generates a filtered output signal 730. Typically, feed forward filter 714 mitigates for inter-symbol interference (ISI). Signal 730 is added by adder 716 with the output 732 of decision feedback filter 720 to generate signal 734. Slicer 718 acts on signal 734 to generate output signal 736. Output signal 736 is provided to subsequent stages of the PHY, as discussed above. In addition, signal 736 represents the input to decision feedback filter 720.

THP 708 and DFE 738 have similar functions, which include equalization to enhance the quality of the received signal at PHY node 704. Specifically, THP 708 performs non-linear pre-equalization on the transmitted signal, while DFE 738 ensures that equalization filtering at the receiver operates on the received signal and avoids enhancing the noise received on the link.

As shown in FIG. 7, decisions by slicer 718 based on signal 734 are fed back into signal 734 by decision feedback filter 720. Under certain conditions (e.g., wideband EMI events), slicer 718 can make a large number of wrong decisions, which when fed back into signal 734 cause a build up of errors and ultimately cause DFE 738 to enter into an infinite error propagation condition. To resolve such condition, DFE 738 needs to be restarted or restored to a normal operating state.

Under the 10 GBASE-T standard, resolving an infinite error condition requires restart of the link and a reset of the DFE. However, often times, as embodiments of the present invention recognize, restart of the link and reset of the DFE are not necessary to resolve an infinite error condition, and simply restoring the DFE to a normal state suffices to restore normal receiver operation. Embodiments of the present invention for restoring the DFE to normalcy without the need for reset and complete link re-training will now be provided.

Figure 8:
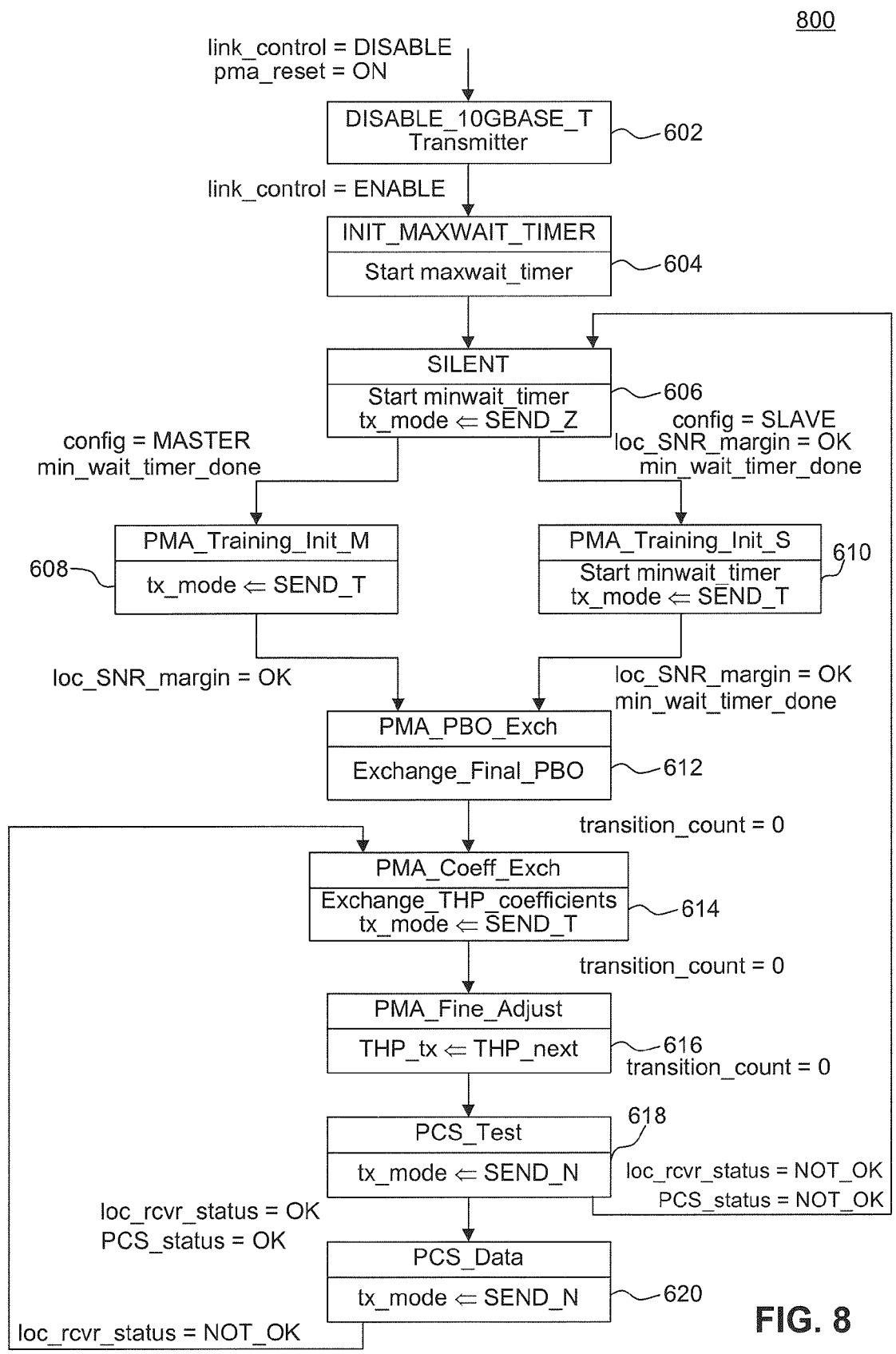
FIG. 8 illustrates an example modified PHY Control state diagram according to an embodiment of the present invention.

FIG. 8 illustrates an example modified PHY Control state diagram 800 according to an embodiment of the present invention. Diagram 800 is substantially similar to diagram 600 described above with reference to FIG. 6, with one particular modification relating to the transition from PCS_Data state 620 upon detecting of an error condition at the local receiver.

In particular, as shown in FIG. 8, instead of transitioning to SILENT state 606 as prescribed in the standard, in state diagram 800 the PHY Control module transitions to one of the final training states, as appropriate, when an error condition is detected at the receiver. For example, the PHY Control may transition to PMA_Coeff_Exch state 614. Alternatively, the PHY Control may transition to PMA_Fine_Adjust state 616 or to PMA_PBO_Exch state 612. In an embodiment, firmware/hardware at the receiver (can be implemented within PMA Receive 418 or as a separate module of PHY) determines whether the transition should occur to PMA_Coeff_Exch state 614 or to PMA_Fine_Adjust 616, depending on the severity of the link failure. Further, the same firmware/hardware at the receiver may determine the time period that the PHY Control remains within each of the states. For example, in an embodiment, to accelerate PHY re-training, the transition count associated with each of the states 612, 614, and 616 can be reduced. Alternatively, if link failure was due to severe EMI events, longer periods may be preferred.

In an embodiment, as shown in FIG. 8, the PHY Control transitions from PCS_Data state 620 to PMA_Coeff_Exch 614, for example, upon error condition at the receiver. Typically, error condition is triggered by frequent decoding failures (i.e., LDPC and CRC returning non-zero syndrome in LDPC decoder) within PMA Receive 418, which cause PMA Receive 418 to set loc_rcvr_status 428 to NOT OK. This in turn, as shown in FIG. 8, triggers re-training transition from PCS_Data state 620 to PMA_Coeff_Exch 614, for example, within the PHY Control module. Further, re-training transition at one node triggers re-training transition at the other node. In particular, when one node transitions from PCS_Data state 620 to PMA_Coeff_Exch 614, for example, it sets its transmission mode to SEND_T and begins transmitting PMA training frames. The receiver of the other node, expecting user data, experiences several decoding failures when it receives training data, which triggers transition to re-training, as described above. Thus, both nodes can enter re-training nearly simultaneously.

In another embodiment, added hardware is built-in within PMA Receive 418 for early detection of re-training transition at the other node. Accordingly, the node does not have to wait until it experiences decoding failures due to PMA training frames to initiate re-training. Instead, the added hardware acts to detect a transition from user data to PMA training frames in the data stream received from the other node, which signals that the other node has transitioned to re-training mode. The added hardware operates in parallel to the LDPC decoder on PMA Receive 418.

It is noted that in PMA_Coeff_Exch state 614, for example, the transmission mode is set by the PHY Control to SEND_T. As such, PMA training frames containing known pseudorandom sequences are exchanged by the two nodes during PMA_Coeff_Exch state 614. Accordingly, in an embodiment, firmware/hardware is added at the receiver which exploits the knowledge of the exchanged pseudorandom sequences in order to characterize the link condition and determine the amount of re-training necessary to restore the link to normal operation. For example, in an embodiment, the firmware/hardware may determine that re-training is required only to the extent of having the DFE exit its infinite error propagation condition and return to normal condition (e.g., sufficient time for the DFE to adapt its tap filter coefficients). Thus, the firmware/hardware may determine that exchange of THP coefficients using the Info Field is not required, for example. Alternatively, the firmware/hardware may determine that full exchange of THP coefficients is again required. In another embodiment, the Info Field is used by the receiver to signal the remote transmitter how much training the receiver requires.

As would be understood by a person skilled in the art based on the teachings herein, depending on the amount of re-training necessary, certain parameters acquired in a previous training process are discarded while others are retained. Accordingly, embodiments include hardware/firmware for determining which parameters need to discarded/stored and to implement purge/storage of training parameters, as necessary.

V. Pre-emptive EMI Mitigation

Embodiments also provide pre-emptive EMI mitigation mechanisms to avoid link failure due to EMI. In an embodiment, the auxiliary bit (AUX) of LDPC coded user data frames is used to implement a back-channel between the a receiver and a remote transmitter. For example, the back-channel can be implemented between the residual DFE of the receiver and the THP of the remote transmitter. In particular, embodiments include firmware/hardware for monitoring the EMI spectrum at the receiver side and conveying information regarding the EMI spectrum to the transmit side. At the transmit side, based on the conveyed EMI spectrum information, troublesome frequencies at which severe EMI has been observed may be notched out, as necessary. In an embodiment, the firmware/hardware at the receiver may include firmware/hardware to examine the filter coefficients of the feedback filter of the DFE, and to determine whether EMI has occurred at certain frequencies. Then, the firmware/hardware uses the AUX bit of LDPC code frames to convey information as necessary to the transmit side. In an embodiment, the conveyed information includes frequencies at which severe EMI has been observed. In another embodiment, THP coefficient changes are relayed using the AUX bit. At the transmit side, firmware/hardware receives the conveyed information and controls the THP to use the information, as necessary, to notch out particular frequencies of the transmitted user data signal. Thus, embodiments provide a dynamic and adaptive mechanism that mitigates against link failures due to EMI.

VI. Conclusion

Embodiments have been described with reference to a particular type of link communications, namely Ethernet communications. Embodiments however can be used and extended to other types of link communications, which may suffer from the problems discussed above and may benefit from embodiments of the present invention.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method for re-training a physical layer transceiver (PHY) coupled to a communications link, comprising:
   identifying a re-training condition including examining filter coefficients of a decision feedback equalizer (DFE) of the PHY to determine whether an electromagnetic interference (EMI) event caused the re-training condition;
   determining responsive to the re-training condition a PHY state transition of the PHY from a user data sending state to a PHY training state, wherein determining the PHY state transition comprises choosing the PHY training state from a plurality of PHY training states of a PHY training sequence of PHY based on the determination of whether an EMI event caused the re-training condition;
   transitioning the PHY from the user data sending state to the PHY training state; and
   returning the PHY to the user data sending state when a receiver module of the PHY is returned to a normal condition or when a pre-determined timer expires.

2. The method of claim 1, wherein identifying the re-training condition comprises detecting an error condition in the receiver module of the PHY.

3. The method of claim 2, wherein detecting the error condition comprises detecting one or mode decoding failures in the receiver module.

4. The method of claim 2, wherein detecting the error condition comprises detecting a non-zero syndrome condition in a Low Density Parity Check (LDPC) decoder of the receiver module.

5. The method of claim 1, wherein identifying the re-training condition comprises identifying a transition from user data frames to training frames in the receiver module of the PHY.

6. The method of claim 5, wherein identifying the transition from user data frames to training frames comprises identifying a transition from Low Density Parity Check (LDPC) coded data frames to Physical Medium Attachment (PMA) training frames.

7. The method of claim 1, wherein transitioning from the user data sending state to the PHY training state comprises transitioning from a PHY PCS_Data state to a PHY PMA_Coeff_Exch state.

8. The method of claim 1, wherein transitioning from the user data sending state to the PHY training state comprises transitioning from a PHY PCS_Data state to a PHY PMA_Fine_Adjust state.

9. The method of claim 1, wherein transitioning from the user data sending state to the PHY training state comprises transitioning from a PHY PCS_Data state to a PHY PMA_P-BO_Exch state.

10. The method of claim 1, further comprising:
    transitioning from the PHY training state to one or more intermediary PHY training states before returning to the user data sending state.

11. The method of claim 10, further comprising:
    determining, based on the link condition, respective time periods for remaining in the PHY training state and each of the one or more intermediary PHY training states.

12. The method of claim 10, further comprising:
    performing the PHY training state and the one or more intermediary PHY training states as prescribed by the IEEE 802.3 standard.

13. The method of claim 10, further comprising:
    performing the PHY training state and the one or more intermediary PHY training states with reduced transition counts, thereby accelerating the PHY re-training.

14. The method of claim 10, further comprising:
    performing the PHY training state and the one or more intermediary PHY training states as necessary to enable the receiver module of the PHY to return to said normal condition.

15. The method of claim 10, further comprising:
    performing the PHY training state and the one or more intermediary PHY training states as necessary to enable the DFE of the PHY to exit an infinite error propagation condition.

16. The method of claim 1, wherein the PHY training state is a training state prescribed by the IEEE 802.3 standard.

17. The method of claim 1, wherein the communications link is an Ethernet link.

18. A method performed by a device for mitigating against failure of a communications link, comprising:
    monitoring energy of a user data signal received by the device over the communications link from a transmitter;
    identifying by the device, based on the monitored energy, an electromagnetic interference (EMI) event on the communications link, wherein identifying the EMI event on the communications link comprises examining filter coefficients of a decision feedback filter of the device; and
    conveying information regarding the identified EMI event from the device to the transmitter, the information configured to adapt the user data signal based on the identified EMI event, and wherein the information includes changes to coefficients of a precoder of the transmitter.

19. The method of claim 18, wherein conveying the information comprises conveying the information using an auxiliary bit (AUX) of Low Density Parity Check (LDPC) coded user data frames sent to the transmitter.

20. The method of claim 18, wherein conveying the information comprises sending the information from a Decision Feedback Equalizer (DFE) of the device to the precoder of the transmitter.

21. A physical layer interface transceiver (PHY), comprising:
    a transmitter and a receiver configured to communicate data over a communications link to a link partner, the receiver including a Decision Feedback Equalizer (DFE); and
    a PHY controller coupled to the transmitter and receiver, configured to:
    receive an indication of a re-training condition;
    examine filter coefficients of the DFE of the receiver to determine whether the re-training condition was caused by an electromagnetic interference (EMI) event;

select a PHY training state from a plurality of PHY training states in a PHY training sequence when the filter coefficients indicate that an EMI event caused the re-training condition, wherein the selected PHY training state bypasses one or more other PHY training states of the plurality of PHY training states in the PHY training sequence; and transition the transmitter and receiver from a user data sending state to the selected PHY training state.

22. The PHY of claim 21, wherein the PHY controller is further configured to generate information regarding the EMI event and cause the transmitter to transmit the information to the link partner, wherein the information includes changes to coefficients of a precoder of a transmitter of the link partner.

* * * * *